Figure 1:
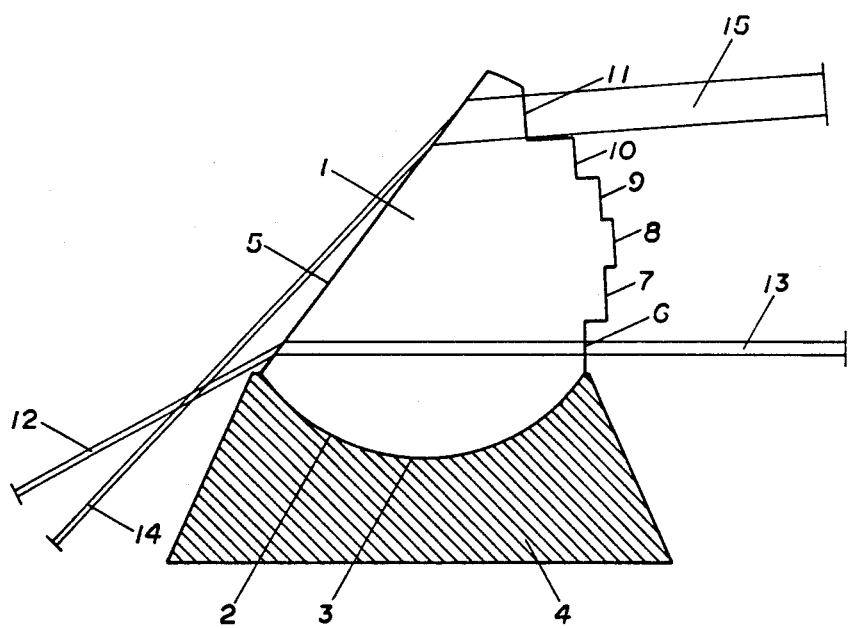

United States Patent [19]

Clegg

[11] Patent Number: 4,609,254
[45] Date of Patent: Sep. 2, 1986

[54] MULTIPLE PRISM

[76] Inventor: John E. Clegg, 2320 Keystone Dr., Orlando, Fla. 32806

[21] Appl. No.: 643,162

[22] Filed: Aug. 22, 1984

[51] Int. Cl.⁴ .................................................. G02B 5/04
[52] U.S. Cl. ....................................... 350/286; 350/484
[58] Field of Search .................................. 350/286, 6.4

[56] References Cited

U.S. PATENT DOCUMENTS 2,405,960  8/1946  Land ................................... 350/286
3,064,523  11/1962  Meltzer ............................... 350/286

FOREIGN PATENT DOCUMENTS 0119260  9/1979  Japan .

OTHER PUBLICATIONS

Houston, Jr., "Optical Systems Manufacturing Technology", *Optical Engineering*, 7/8-1974, vol. 13, No. 4, pp. 160-161.

Price, "Collimated Light Beam Expander-Compressor", *Xerox Disclosure Journal*, 9/10-1981, vol. 6, No. 5, pp. 253-254.

*Primary Examiner*—John K. Corbin
*Assistant Examiner*—Rebecca D. Gass

[57] ABSTRACT

A cylindrical glass prism with one planar entry face which refracts incident beams and with multiple exit faces perpendicular to the refracted beams which are emitted without refraction and without reduction in width. The prism can be revolved on a concave cylindrical base.

1 Claim, 1 Drawing Figure

MULTIPLE PRISM

BACKGROUND

Prior art includes the *Luminous Flux Diverging Apparatus Using Prisms*, Japanese Pat. No. 119,260, Sept. 17, 1979, Kazuo Sanagi. This apparatus uses four unaligned prisms to concentrate a linear beam. The prisms can be revolved on pins.

DRAWINGS

FIG. 1 is an elevation of the multiple prism.

DESCRIPTION

FIG. 1 shows the multiple prism 1 which is a longitudinal segment of a glass cylinder. Lower convex cylindrical wall 2 is mounted in concave cylindrical wall 3 of base 4, allowing the prism to be revolved at various angles to the incident beam.

There is one entry face 5 which refracts six incident beams into the prism. There are six opposed exit faces 6–11 perpendicular to the refracted beams which are emitted without refraction and reduction in width. The six refracted beams are increased in width by factors of $2\times$, $3\times$, $4\times$, $5\times$, and $7\times$.

Two incident beams and two refracted beams are shown in the drawing. They are incident beam 12 with angles of incidence and refraction of 66° and 37.5°, forming refracted beam 13 with increased width of $2\times$, and incident beam 14 with angles of incidence and refraction of 83.9° and 41.5°, forming refracted beam 15 with increased width of $7\times$.

I claim:

1. A multiple prism (1) comprising a longitudinal segment of a glass cylinder with one planar entry face (5) and multiple exit faces (6–11) disposed at varying angles to entry face (5), with all faces (5, 6–11) parallel to the cylindrical axis of the prism (1).

* * * * *